Figure 1:
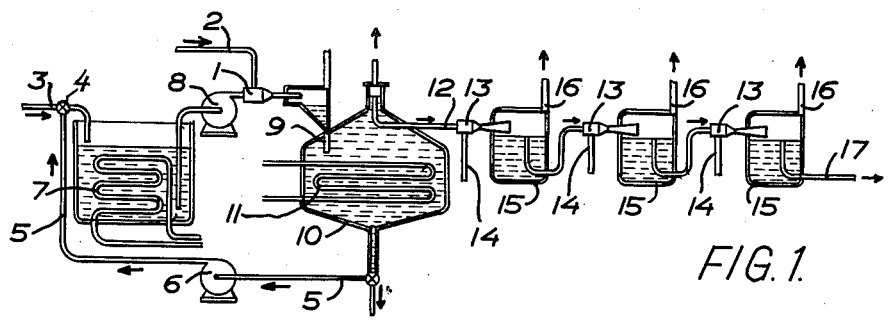

March 6, 1956     N. A. P. NILSSON     2,737,522

METHOD FOR MANUFACTURING ORGANIC NITRO COMPOUNDS

Filed Nov. 3, 1952

INVENTOR.
N. A. P. Nilsson
BY Henry C. Parker
Atty.

United States Patent Office 2,737,522
Patented Mar. 6, 1956

2,737,522
METHOD FOR MANUFACTURING ORGANIC NITRO COMPOUNDS

Nils Agne Percy Nilsson, Gyttorp, Sweden, assignor to Nitroglycerin Aktiebolaget, Gyttorp, Sweden, a corporation of Sweden Application November 3, 1952, Serial No. 318,386

Claims priority, application Sweden November 6, 1951

10 Claims. (Cl. 260—467)

The present invention concerns a method for carrying out nitrating reactions in the production of organic nitro compounds. As an example hereof may be mentioned the production of nitroglycerine, and the invention is described below as applied to the production of nitroglycerine, although it is by no means restricted thereto.

According to the continuous methods for producing nitroglycerine hitherto used the reaction components, glycerine and nitrating acid, are brought together in a nitrating apparatus equipped with stirrer, which apparatus simultaneously serves as a mixing, reaction, cooling and eventually heating plant. In this apparatus, depending on its capacity, 100–500 kg. are treated under rapid stirring for about 15 minutes at a reaction temperature of 20–25° C. From the nitrating apparatus the reaction mixture is then allowed to flow continuously down into a separator, which eventually is provided with cooler. From there the acid nitrated product is removed and passed through a washing system, which is either made up of series of containers equipped with stirrers, into which the nitrated product and washing liquid are introduced, or which also contains a series of washing units with injector, washing column and separator attached thereto, whereby the number of washing units is made large enough to produce a finished product of the desired grade of purity.

This method has several important disadvantages. The vigorous stirring during the relatively long treatment in the nitrating apparatus often results in the formation of suspensions of the nitrated product, from which it only with difficulty can be separated, whereby the recovery of nitroglycerine is impaired. Further, in spite of the vigorous stirring, it may happen that the mixing of the reaction components, due to the large quantity of the charge, will not be satisfactory and that, for this reason, unstable reaction products are formed, which are subject to decomposition, whereby the safety of the process is hazarded. Furthermore, the presence of such a large amount of explosive substance in the nitrating apparatus during so prolonged a time involves considerable risks.

The above mentioned inconveniences are obviated by the present invention and, in addition thereto, considerable advantages are obtained.

The invention is based on the surprising observation that the production of nitroglycerine and similar nitrating reactions—although esterifying reactions—and also formation of other nitro compounds, can be carried out instantly and with good yield in an injector. This is the more remarkable, as similar reactions do not usually take place easily and require a certain time before proceeding to a state of equilibrium. An important condition according to the invention is that the reaction components are supplied to the injector with suitably regulated temperature for optimal conditions of reaction.

In conformity with the observations mentioned above, according to the invention, the temperature of the reaction components are regulated in such a way that they are supplied with a heat content suitable for the nitrating reaction to be carried out, when mixed. The reaction components are then supplied separately to the injector, which preferably is of venturi-shaped type, the nitrating acid being introduced into the injector under pressure and drawing by suction or aspirating the other reaction component from a supply conduit into the injector where the components are intimately mixed practically instantly. The reaction takes place immediately and is performed substantially in the injector itself, consequently within a very limited volume. The reaction mixture thus obtained is then transferred to a separator where the nitro products produced are separated from the remaining acid and recovered. Preferably a portion of the remaining acid, if required after cooling or heating, is returned and circulated in the process and introduced into the injector along with newly added nitrating acid.

In practice, the method is preferably carried out in such a way that the reaction is carried out in an injector, which is directly mounted on a separator, into which the reaction mixture flows out directly from the injector and where the nitro-products formed are separated from the remaining acid, whereupon a portion of this acid, eventually after temperature regulation, is reintroduced into the process, while the separated nitro products are subjected to washing in a washing system, comprising washing units each consisting of an injector and a separator coupled together.

According to this method the manufacturing process proceeds continuously, rapidly and completely without practically any disturbances. The mixing of the reaction components in the injector takes place instantly and completely whereupon the reaction is instantaneous. The separation of the reaction products likewise takes place instantly and without any addition of separating agents increasing the separating velocity, a surprising fact, which makes possible a reduction in the size of apparatus required for the separation. The washing also is performed in a simple and efficient way.

To advantageous results the method of the invention contributes also to a large extent the circumstance that every stage or phase of the process (contrary to what is the case in the nitrating methods hitherto used, as indicated above), is carried out in a special part of the apparatus, which is constructed solely with regard to its function in the phase in question, and in this way it is possible to obtain an equipment whose construction is more efficient in all details.

In summing up the advantages obtained with the method according to the invention as compared with the nitrating methods hitherto employed, special mention should be made of the following:

(1) The apparatus is essentially simpler and less complicated and at the same time requiring less space, whereby the costs of apparatus as well as the costs of the necessary establishment are considerably reduced.

(2) The apparatus contains no moving parts.

(3) On account of the small amount of charge in the injector and the very short reaction time the risk of emulsion formation, as mentioned above, is almost completely eliminated as well as the formation of unstable intermediary products, whereby a maximum recovery of nitroglycerine is obtained.

(4) Owing to the efficient mixing in the injector and the small amount of charge a moderate raise of temperature in excess of what has so far been considered allowable, results in an appreciably lesser element of danger than in case of using the large reaction containers hitherto employed in which the mixing of the components often is unsatisfactory.

(5) Owing to the small amount of charge in the injector and the rapid carrying out of the separation of the reaction mixture, the amount of explosive matter at hand within a certain time in the workshop, is comparatively small, wherefore risks of explosion to a great extent are eliminated.

(6) The apparatus can easily be controlled by careful instrumentation and regulated from a distance, which reduces risks of personal injury to a minimum.

It may thus be stated that in using the method according to the invention, the margin of safety in various aspects is considerably greater than in the previously known methods of nitration.

Figure 2:
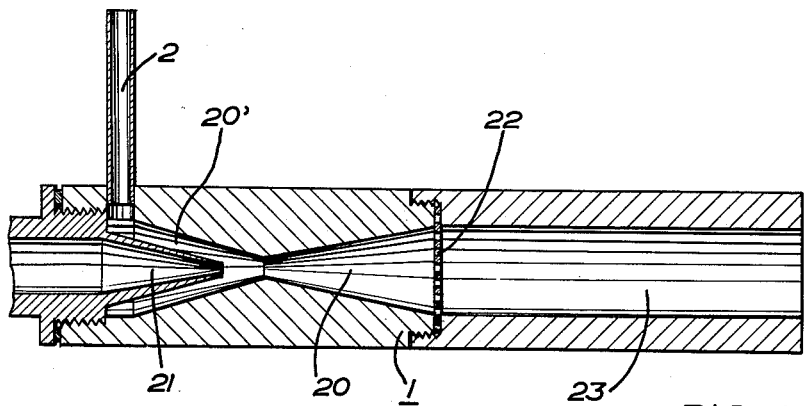

The method of the invention, as actually used in practice, is described more fully below in connection with the production of nitroglycerine with reference to the accompanying drawing in which by way of example Fig. 1 schematically shows a plant for carrying out the method, while Fig. 2 is an axial section through the reaction injector of the plant.

To the reaction injector 1 glycerine is supplied through the conduit 2. Nitrating acid consisting, for example, of 40–65% $HNO_3$ and 60–35% $H_2SO_4$, is supplied through the conduit 3 to an injector mixer 4 where it is mixed with up to 5 parts of spent acid (recycled acid) which is circulated and reintroduced into the process, dependent on the $HNO_3$ contents of said acid. In case of charging glycerine (or ethylene glycol) and nitrating acid in the ratio 1:3–6, the composition of the recycled acid generally will be as follows: 8–25% $HNO_3$, 55–80% $H_2SO_4$, 5–25% $H_2O$ and 1–9% organic products. The recycled acid is supplied through the conduit 5 by means of the pump 6. In order to obtain the desired reaction temperature the mixture of newly added nitrated acid and recycled acid is cooled in the cooler 7 down to a temperature of between $+5°$ C. (at the highest content of recycled acid) and $-20°$ C. (in case of a low content of recycled acid). The acid mixture thus cooled is then by means of the pump 8 pumped or pressed into the reaction injector 1, thereby drawing by suction the glycerine from its supply conduit 2 into the injector. For regulating the supply of glycerine said conduit is also provided with a valve (not shown).

The reaction injector 1 is constructed as illustrated in Fig. 2. It consists of an annular venturi-shaped chamber 20, in one end of which projects a conical nozzle or injector jet 21 for supplying the nitrating acid under pressure. Between the outer side of the jet 21 and the wall of the venturi-shaped chamber 20 is an annular space 20', in the rear end of which the glycerine supply conduit debouches. Owing to the suction and whirling movement or turbulence taking place in the venturi-shaped chamber 20 the reaction components are intimately mixed with each other and the reaction takes place practically instantly and substantially completely within the venturi chamber itself. In front of the discharge opening of the venturi chamber 20 is a perforated plate 22 and in front of this perforated plate the injector is prolonged with a cylindrical discharge part 23.

The reaction mixture thus obtained then passes through the conduit 9 to the separator 10, which is equipped with a cooling coil 11. In the separator two layers are formed, of which the lower one consists of remaining acid and the upper one of nitroglycerine, which is discharged from the separator through an outflow 12 and passes into the washing plant. In the separator the spent acid is suitably cooled down to a temperature of between 0 and 10° C., whereupon it is removed through the bottom of the separator and partly returned to the process through the conduit 5 in the manner indicated above.

The washing of the nitroglycerine thus produced, whereby it is freed from acid dissolved therein and carried through from the separator, is performed in a washing plant consisting of three washing units coupled together in series, each of which is composed of an injector 13, into which washing liquid is supplied through the conduit 14, and a separator 15, from which waste washing liquid passes out through the conduit 16. The washing may be carried out with water, or also with water containing a weak alkaline substance, such as ammonia, soda or sodiumbicarbonate. To increase the washing effect it may further be suitable to allow air to be drawn into the injector. The finally washed product is removed from the last washing separator through the conduit 17. In the example shown the washing is carried out in three units, but a greater or smaller number of washing units may be used if necessary with regard to the desired grade of purity of the product.

Although the process has been described above mainly in connection with the production of nitroglycerine, the invention is, as mentioned above, not restricted hereto. Examples of other materials, which may be produced in a similar way are among others dinitrodiethyleneglycol, dinitrodiethylenediglycol, mononitrobenzene, mononitrotoluene, ethyl nitrate and the like.

Furthermore it should be mentioned, that the process may be applied also for nitrating in several steps, in which case the process may be carried out in two or more series-coupled reaction injectors and separators.

I claim:

1. In the manufacture of organic nitro compounds, selected from the group consisting of nitroglycerine, glycol nitrate, dinitrodiethyleneglycol, dinitrodiethylenediglycol, mononitrobenzene, mononitrotoluene and ethyl nitrate, which can be produced by contacting the corresponding unnitrated organic compounds with a nitrating acid in the liquid phase; the improvement which comprises injecting under pressure and in the form of a turbulent jet a nitrating acid into a constricted elongated reaction zone, aspirating the corresponding unnitrated compound to be nitrated into said jet by the vacuum produced by said jet and controlling the reaction temperature in the jet mixture within safe limits by control of the temperature of the nitrating acid within the range of from about 5° to $-20°$ C. passing the reaction mixture from said jet into a separating zone and there separating the spent acid from the resulting organic nitro compound.

2. The process of claim 1 wherein part of said spent acid is recycled to be mixed with the nitrating acid.

3. The process of claim 1 wherein said constricted reaction space is the venturi chamber of an injector.

4. The process of claim 1 wherein the nitrated reaction product is washed by jet mixing it with water in a constricted washing zone.

5. The process of claim 1 wherein the nitrating acid is a mixture of nitric and sulfuric acids.

6. The process of claim 1 wherein the nitrated reaction product is washed by injecting it into a constricted washing zone and aspirating water into said zone to be mixed with the jet of nitrated product, followed by separating the wash water from the so-purified nitrated product.

7. In the manufacture of nitroglycerine, the process which comprises injecting under pressure and in the form of a turbulent jet a nitrating acid, containing from about 40 to 65% of nitric acid and from about 60 to 35% of sulfuric acid at a temperature of from about $+5°$ to $-20°$ C., into a constricted elongated reaction zone, aspirating glycerine into said jet by the vacuum produced by the jet thereby mixing it with the nitrating acid, the ratio of glycerine and nitrating acid being from about 1:3 to 1:6, and separating the spent acid from said reaction mixture.

8. The process of claim 7 wherein the spent acid is recycled to be mixed with the nitrating acid in quantity amounting to not substantially more than about 5% by weight.

9. The process of claim 7 followed by washing the nitroglycerine by injecting it under pressure into a constricted washing zone, aspirating wash water into said zone and mixing it with the jet of nitroglycerine, then separating the wash water from the nitroglycerine.

10. The process of claim 9 wherein air is also aspirated into said washing zone to increase the washing effect.

References Cited in the file of this patent

UNITED STATES PATENTS

| | | |
|---|---|---|
| 449,687 | Maxim | Apr. 7, 1891 |
| 2,254,352 | Cloud | Sept. 2, 1941 |
| 2,363,834 | Crater | Nov. 28, 1944 |

OTHER REFERENCES

Crater: Industrial and Engineering Chemistry, #40, pp. 1627–35 (1948), I. G. Farbenindustrie A. G., P. B. Report 58,633, May 30, 1944.